us # United States Patent [19]

Bertsche

[11] Patent Number: 4,748,642
[45] Date of Patent: May 31, 1988

[54] DOUBLE DETECTION VIDEO PROCESSING APPARATUS

[75] Inventor: George J. Bertsche, Woodburn, Ind.

[73] Assignee: ITT Aerospace Optical, Fort Wayne, Ind.

[21] Appl. No.: 908,484

[22] Filed: Sep. 17, 1986

[51] Int. Cl.⁴ .............................................. H04L 27/06
[52] U.S. Cl. ...................................... 375/94; 455/150; 329/146
[58] Field of Search .................. 375/75, 76, 94, 80; 329/146, 147, 167; 455/134, 137, 143, 150, 214

[56] References Cited

U.S. PATENT DOCUMENTS

| | | | |
|---|---|---|---|
| 4,006,462 | 2/1977 | Podowski et al. | 371/69 |
| 4,156,848 | 5/1979 | Stimple et al. | 329/146 |
| 4,311,877 | 1/1982 | Kahn | 455/59 |
| 4,449,246 | 5/1984 | Seiler et al. | 455/16 |
| 4,653,073 | 3/1987 | Vercellotti et al. | 375/74 |

Primary Examiner—Michael A. Masinick
Assistant Examiner—Stephen Chin
Attorney, Agent, or Firm—Robert A. Walsh; Thomas N. Twomey; Mary C. Werner

[57] ABSTRACT

There is disclosed an improved double detection receiver for detecting pulsed RF carrier signals. The receiver employs first and second channels with the first channel being a narrower band than the second channel. Each channel is associated with signal detection circuit to provide first and second detected output pulses. These pulses are summed or substracted to provide an output pulse indicating the sum or difference of each channel signal and this output pulse is appplied to a frequency comparator. One of the detected signals is also applied to a signal strength comparator whose output is gated via gating circuit with the output of the frequency comparator to provide a pulse present output for the presence of both input signals at said gating circuit. The use of the frequency comparators assures improved operation of the double detection receiver.

20 Claims, 5 Drawing Sheets

DOUBLE DETECTION VIDEO PROCESSING APPARATUS

BACKGROUND OF THE INVENTION

This invention relates in general to pulsed RF systems and more particularly to a double detection receiver to be employed in such a system.

Pulsed RF systems have been widely employed and sometimes they are referred to as on/off keying systems (OOK) or amplitude shift keying systems (ASK). In such systems, a carrier amplitude is turned on and off generating a pulsed waveform which essentially consists of rectangular pulses. These systems may employ pulse shaping such as raised cosine, etc. or other types of shaping which are used to conserve bandwidth.

Essentially, such systems utilize relatively simple receivers wherein the detection can be either coherent or non-coherent. In any event, the systems also employ single and double detection schemes in the receivers. These receivers are used to receive and demodulate the pulsed RF signal by either scheme using crystal video detection with RF amplifiers and RF bandpass filters for selectivity.

Both single and double detection receiver systems were attendant with various problems. In the single detection receiver system, one required relatively expensive filters in order to effectively respond to the pulsed RF signal. Hence such systems employed complicated filter designs which required substantial tuning and adjustment.

The single detection receiver systems employed filters which had many poles and hence were attendant with group phase delay and other transmission delays which again resulted in serious problems. In regard to the single detection system spikes are also produced by a single channel receiver utilizing a multipole filter when the receiver was subject to strong short rise time RF pulses. Such pulses which are 20 db or more down the filter skirt would cause spikes to appear in the detected video signal. In any event, these spikes caused false thresholding and false outputs making the single detection receivers unreliable upon the receipt of certain signals.

As indicated above, while single detection receivers have been widely employed they are attendant with the problems in producing and fabricating complex filters using multiple poles thereby causing excessive amounts of phase distortion and filter delays. In order to circumvent and render the filtering problem simpler, the prior art then utilized double detection receiver systems. In any event, these receiver systems have never found acceptance because of other disadvantages.

In such receivers the threshold vs. frequency was not as constant from band edge to band edge as with a single detection receiver utilizing multipole Chebychev filters. The go/no go filter skirts did not have a "brickwall" response but approximated a nine-pole response. What is meant by a "brickwall" response is that essentially all frequencies outside the desired band, when encountering the filter section of the receiver, should encounter an extremely steep filter skirt to prevent those frequencies not within the desired band from passing through the receiver.

Hence for frequencies outside the desired receiver bandwidth, those frequencies should encounter a virtual brickwall in regard to filter response. The term "brickwall" is a term of the art which essentially means an extremely steep filter skirt which thereby prevents any frequencies not within the desired bandpass from passing through the receiver.

In regard to double detection receivers the group delay varied with input pulse rise time as well as with amplitude and RF frequency variation and hence made the previous double detection system impracticable in systems which required constant or predictable delay or phase. This was also, as indicated above, a problem with single detection receiver systems. Also the subtractor which is employed in such receivers produced a negative going video pulse when just outside the designed bandwidth. A negative going 2 percent duty cycle pulse appears like a 98 percent duty cycle pulse and the receiver operates to process it as such hence giving false results. In order to circumvent this problem, the prior art devised various clamping devices which were found to be in-effective.

Thus it is an object of the present invention to provide an improved double detection receiver which circumvents many of the problems as indicated above.

It is a further object of the present invention to provide a double detection receiver having an improved response allowing one to implement simple filter designs while circumventing many of the problems as indicated above.

BRIEF DESCRIPTION OF THE PREFERRED EMBODIMENT

In a double detection receiver apparatus of the type capable of detecting and demodulating a pulsed RF signal and having a first wideband channel and a second narrow band channel with corresponding detectors in each channel for providing a pulse output and an adding circuit for responding to said pulse outputs for providing a difference pulse, in combination therewith apparatus for improving the performance of said receiver comprising, frequency comparator means responsive to said difference pulse and operative to provide an output signal when said pulse is within an acceptable frequency range, a signal strength comparator means responsive to said pulse output in said wideband channel to provide an output signal indicative of an acceptable RF input signal level, means responsive to said frequency comparator output signal and said signal strength comparator output signal to provide a pulse presence output signal only during the presence of both said frequency comparator and said signal strength comparator output signals.

DETAILED DESCRIPTION OF THE FIGURES

Figure 1:
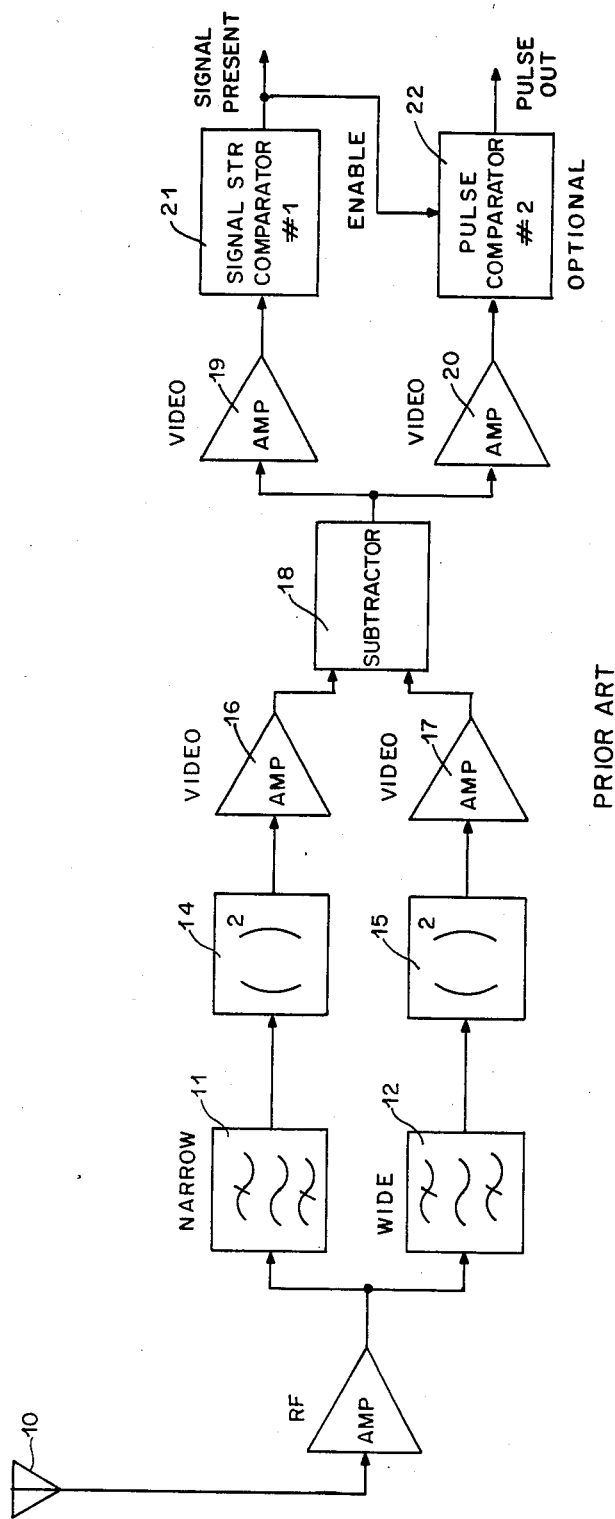
FIG. 1 is a block diagram showing a prior art double detection receiver.

Referring to FIG. 1, there is shown a prior art block diagram of a double detection receiver responsive to demodulate a pulsed RF signal or a signal which is indicative of ON-OFF keying (OOK).

As shown in FIG. 1, the receiver employs a conventional receiving antenna 10 having its output coupled to the input of an RF amplifier. The RF amplifier has one output coupled to a narrow bandwidth channel and a wide bandwidth channel. The wide bandwidth channel includes a bandpass filter 12. The narrow bandwidth channel includes a bandpass filter 11 which has a narrow bandwidth as compared to the bandwidth of filter 12. Each filter is associated with a square-law detector as detector 14, associated with filter 11, and detector 15, associated with filter 12. The outputs of the detectors as 14 and 15 are coupled directly to associated video amplifiers as 16 and 17.

As seen in FIG. 1, the outputs from the video amplifiers are applied to a subtractor circuit 18. The subtractor circuit operates to subtract the detected wide channel video signal from the narrow channel video signal to produce at an output the difference signal which is applied to separate video amplifiers 19 and 20. The amplitude comparator 21 which operates on a given threshold and which has its input coupled to amplifier 19 senses the signal strength associated with the received RF pulse and sets the reception threshold. The setting of the reception threshold enables a pulse comparator 22 which is an optional device and which senses the 50 percent point on the leading edge of the pulse rise time and optionally the trailing edge of the detected pulse and provides a corresponding output pulse which is indicative of a received signal.

Essentially, as seen from FIG. 1, the signal strength comparator is really the only circuit necessary for operations as this will sense a signal of a predetermined level which indicates that proper pulse reception is occurring.

As can be seen from FIG. 1, the prior art receiver utilizes the bandpass filters as 11 and 12 which specify the narrow and wideband channels. These bandpass filters were usually two- or three-pole filters as compared to multiple pole filters used in a single detection receiver. In such receivers the filters employed may be nine poles or greater and required extensive tuning, extensive alignment, and extensive adjustment and are associated with phase and group delay while being expensive components.

As briefly described above, the double detection receiver, as for example that shown in FIG. 1, suffered many problems. First, the threshold vs. frequency was not constant from band edge to band edge, as for example compared to a single detection receiver using a multipole Chebychev bandpass filter. Secondly the go/no go filter skirts did not have brickwall response but approximated a nine-pole response which essentially presented other problems in regard to total receiver sensitivity and operation. Thirdly, the group delay varied with input pulse rise time as well as with amplitude and RF frequency variation and made the previous double detection system impracticable with systems that employed or needed constant or predictable delay or phase. Fourth, the subtractor 18 produced a negative going video pulse when just outside the design bandwidth. This negative going pulse, for example if it had a 2 percent duty cycle, appeared like a 98 percent duty cycle pulse and the circuit would try to process it and gave false results.

Figure 2:
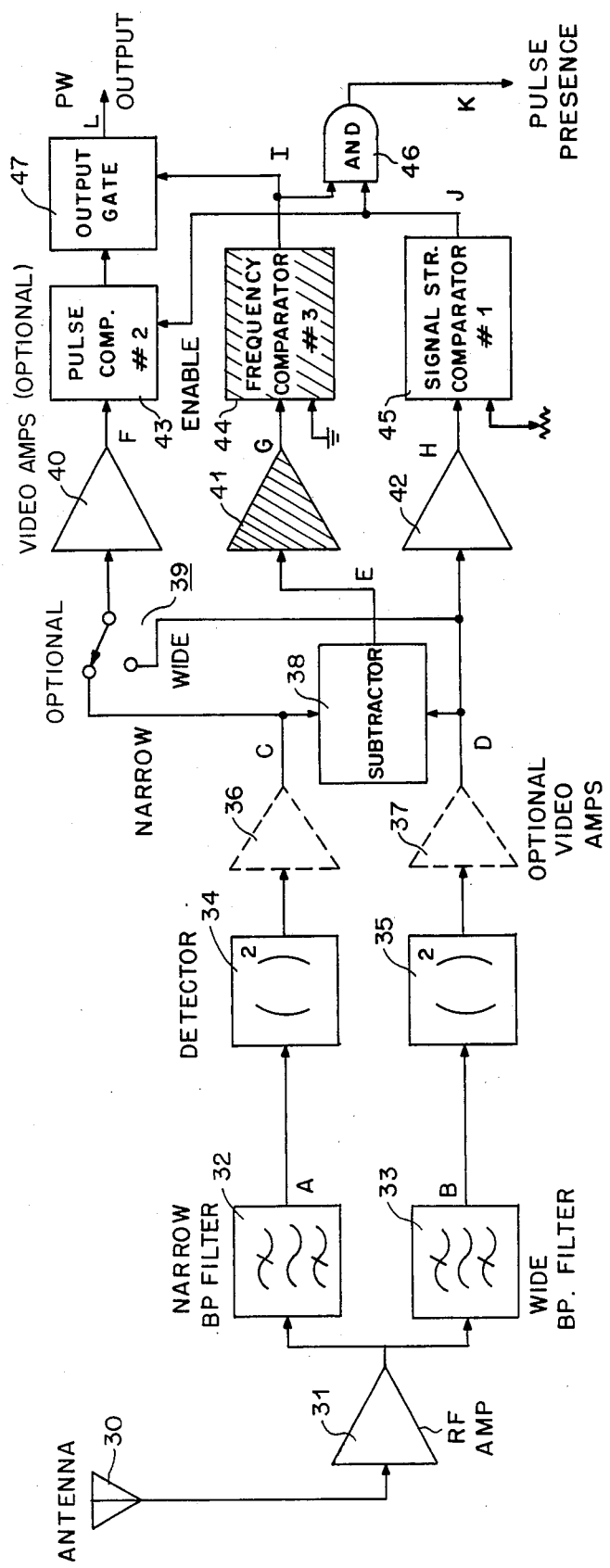
FIG. 2 is a block diagram showing a double detection receiver apparatus according to this invention.

Referring to FIG. 2, there is shown a double detection receiver system according to this invention which incorporates a frequency comparator 44 and an AND gate 46. The frequency comparator 44, as will be explained, is driven by a video amplifier 41 and essentially substantially improves the double detection receiver operation. The frequency comparator 44 is referenced to ground or reference potential rather than a threshold level. This provides a vertical brickwall response at the band edge. This band edge selectively is much steeper than an eleven pole Chebychev filter, and as will be seen, the bandwidth is adjustable.

As seen from FIG. 2, the double detection receiver according to this invention also includes an antenna 30 which has an output coupled to the input of RF amplifier 31. Again, there are two-channels implemented by means of a narrow bandpass filter 32 and a wide bandpass filter 33. As in previous double detection systems, the bandpass filters 32 and 33 both have two or three poles and hence are extremely simple to fabricate.

The narrow bandpass filter 32 has a narrow three db bandwidth and the other filter 33 a wider three db bandwidth. It is desirable for the wide filter 33 to have a relatively flat response over the three db bandwidth of the narrow band filter 32. This aspect is very easily implemented due to the fact that one is discussing two or three pole filters and hence the design of such filters is relatively simple while such filters utilize very few components and require very little tuning. The low pole count of such filters also provides a much flatter delay response over the band. This group delay response is much flatter than for example a single detection system utilized in the prior art.

The outputs of the bandpass filters 32 and 33 are coupled respectively to associated square-law detectors 34 and 35. It is also known that RF amplifiers can optionally be used between the outputs of the filters and the detectors. The two detectors can have the same polarity or one can be made to provide a reverse polarity output. Essentially, square-law detectors are extremely well known in the prior art and encompass or include diode devices which serve as the detection device. Such diode devices obey the square law detection characteristics and hence the name square-law detector is employed for detectors 34 and 35.

At the outputs of the detectors, there is also shown additional optional video amplifiers as 36 and 37 which can also be employed to increase the total gain of the device. It is, of course, understood that the amplifiers 36 and 37 are optional devices and may or may not be included.

In any event, the outputs of the amplifiers are coupled to a subtractor 38 which subtractor functions to subtract the wide output channel video pulse from the narrow channel video pulse and outputs the results.

As seen from the Figure, the output from subtractor 38 is coupled to the input of video amplifier 41 which essentially as indicated above is the driver amplifier for a frequency comparator 44. The amplifier 41 amplifies the difference pulse emanating from subtractor 38 and applies it to the frequency comparator 44. The output of the frequency comparator 44 is coupled to one input of an AND gate 46. The output AND gate 46 will only give a pulse when the frequency comparator 44 and the signal strength comparator 45 are activated by an incoming pulse. If optional pulse comparator 43 is not used, the output of AND gate 46 supplies the pulse present output signal.

As seen from FIG. 2, the pulse comparator 43 is an optional device and is associated with a driver-video amplifier 40. The input of the video-amplifier is coupled to a two-position switch 39 (optional) and can be placed in an upward position whereby the pulse comparator will respond to the output pulse C from the narrow band channel or in the second position will respond to the output pulse D from the wideband channel. The output of the pulse comparator 43 is applied to one input of a gate 47.

As seen from FIG. 2, the frequency comparator 44 serves to enable the output gate 47 associated with the pulse comparator 43. The pulse comparator 43 is also enabled by the signal strength comparator 45.

As seen from FIG. 2, the outputs of the various components are labeled by means of letters used to designate the various signals which are essentially obtained from this circuit. Thus the output of the bandpass filter 32 is designated by A, the output of bandpass filter 33 by B, the output of the detector 34 by C, the output of detector 35 by D, the output of the subtractor 38 by E, the output of video amplifier 40 by F, the output of video amplifier 41 by G, the output of video amplifier 42 by H, the output of the frequency comparator 44 by I, the output of the signal strength comparator 45 is designated by J, the output of the AND gate 46 designated by K, and the output of gate 47 by L. The reason for this nomenclature will be apparent with reference to FIG. 3.

Figure 3:
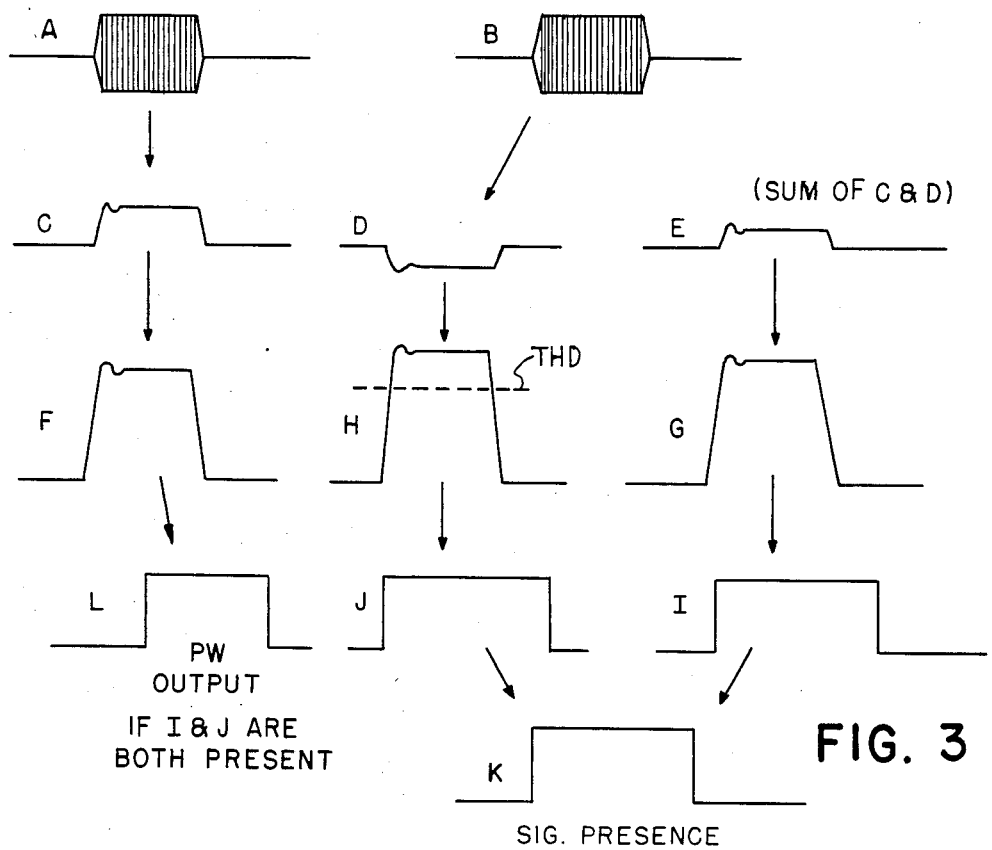
FIG. 3 is a series of waveforms depicting the waveforms at various points in the receiver of FIG. 2 with the incoming RF pulse at the center of the frequency band.

FIG. 3 depicts the various waveforms at the various points in the circuit as designated by the corresponding reference letters, as for example A through L. Essentially the waveform diagram of FIG. 3 depicts the waveforms at various points of the circuit of FIG. 2 with the RF pulse being at the band center. As seen in FIGS. A and B, the pulsed RF signal appears at the outputs of the respective bandpass filters 32 and 33 (FIG. 2). After detection, the signals C and D are produced at the output of the video detectors whereby they are subtracted or summed in circuit 38 to produce the signal shown at E.

As one can see from FIG. 2, the signal E is amplified by means of the video amplifier 41 to produce the output signal G. A signal at the output of video amplifier 42 which is the H signal is also shown and essentially consists of the amplified version of signal D which is inverted due to the operation of video amplifier 42. The signal at the output of video amplifier 40 or signal F is also shown which is essentially the amplified version of video signal C. It is noted that signal D is inverted while signals G and F are not inverted.

As one can ascertain, the inversion or non-inversion is a pure function of the number of video amplifier stages and essentially is not relative to the present invention, but the diagrams of FIG. 3 have been included to more clearly define the operation of the circuit.

As seen from FIG. 2, the signal F appears at the output of the video amplifier 40. The signal H appears at the output of video amplifier 42, while the signal G appears at the output of video amplifier 41. The J signal, which is the output of the signal strength comparator 45, will appear during the presence of the H signal provided that the H signal exceeds the threshold (THD) shown in dashed lines. Thus the J signal activates the pulse comparator 43 while the I signal activates the gate 47 to cause it to produce the L signal if the J and I signals are present. The L signal indicates that both the output from the frequency comparator 44 is present together with the output from the signal strength comparator 45.

The I signal is the output of the frequency comparator 44. This signal activates the output gate 47 thus allowing the L signal to pass while further activating one input of AND gate 46. The other input of AND gate 46 is derived from the signal strength comparator 45, and essentially, if both signals are present will produce the signal present output or pulse present output indicated by waveform K of FIG. 3.

Figure 4:
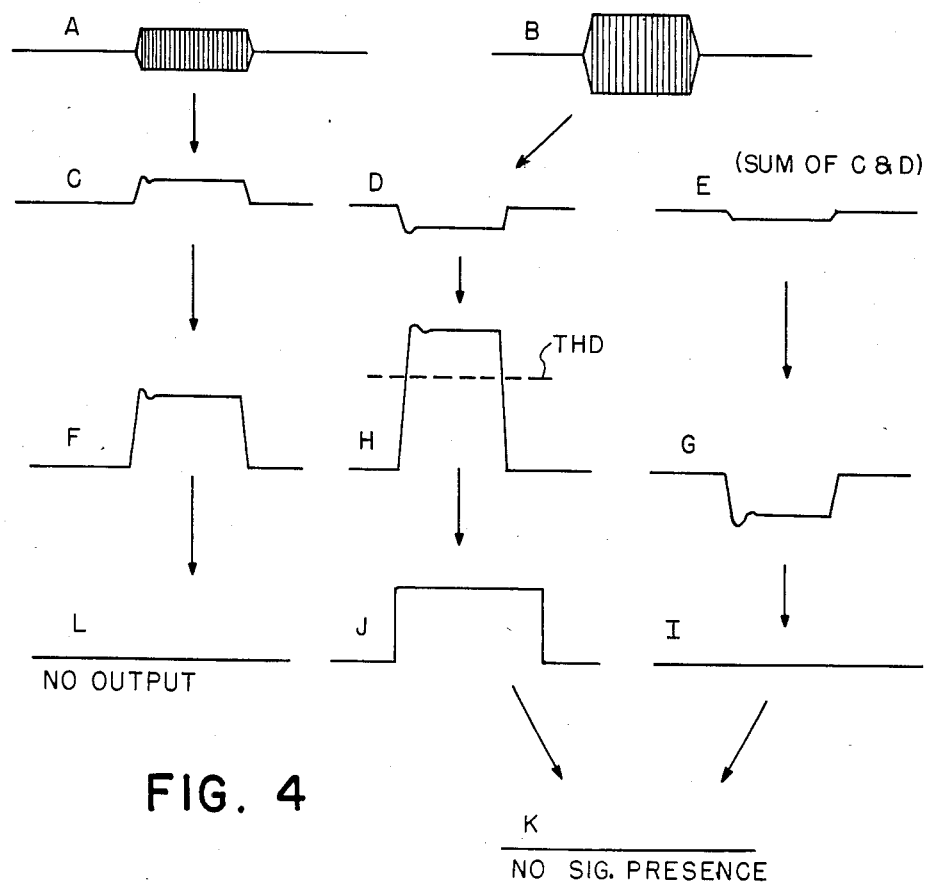
FIG. 4 is a series of waveforms depicting the waveforms at various points of FIG. 2 with the incoming RF pulse outside the frequency limits of the circuit.

Referring to FIG. 4, there is shown the waveforms of the various signals at the various circuit points with a detected RF signal of less than the threshold signal strength (THD) at the band center. As one can ascertain, these waveforms show that an incoming RF signal must be above the threshold level (THD) and inside the frequency limits to produce an output pulse.

As seen from FIG. 4, for the conditions shown, the sum of the C and D signals or the output of the subtractor E is an extremely small signal. This signal E is amplified to produce a negative signal at the output of the video amplifier 41 designated as G. This negative signal produces no output from the frequency comparator, hence there is no I signal. The AND gate 46, whose output signal is K, cannot be activated during this operation. The signal strength comparator still receives a signal whose magnitude is greater than the threshold and hence the signal strength comparator does, in fact, produce the J signal.

In any event, since the output signal I is not present then there is no L signal and there is no signal K from AND gate 46. Hence, as seen during this condition, even though the incoming pulse is detected by the circuitry, the circuit will produce no pulse presence signal and no PW output signal. This is strictly due to the operation of the frequency comparator 44 which will not operate for a negative going G pulse signal.

Figure 5:
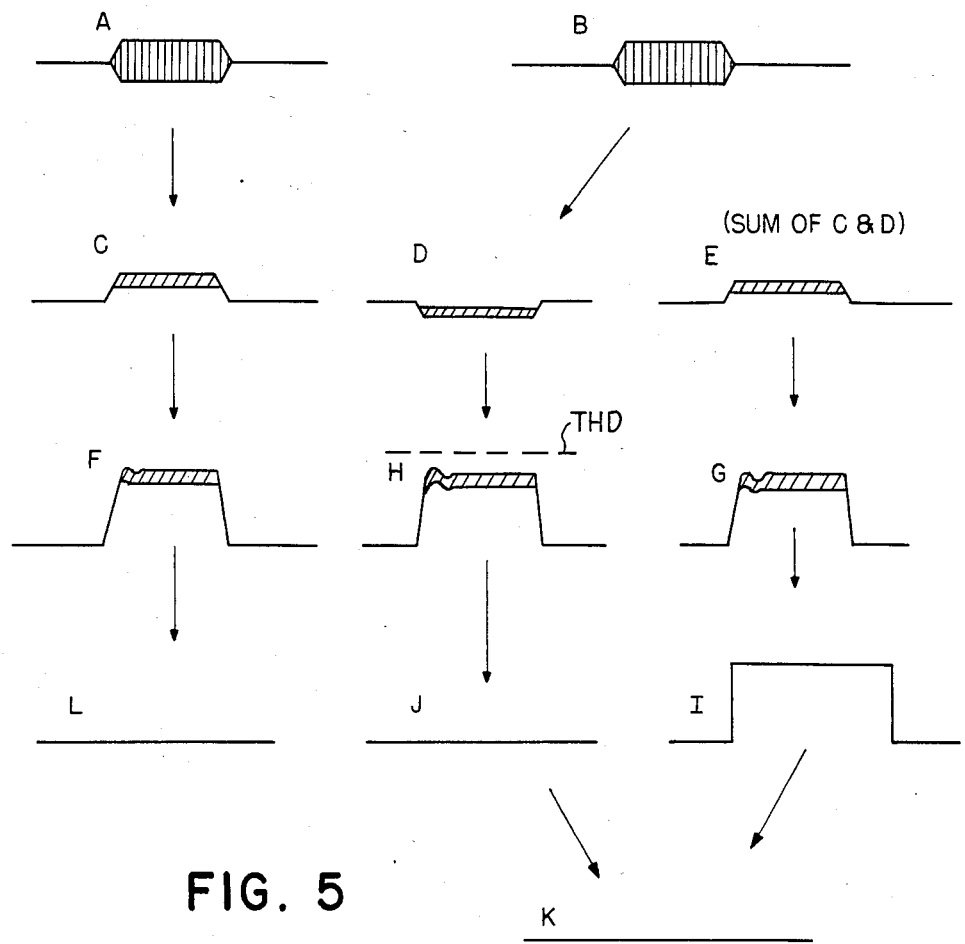
FIG. 5 is a series of waveforms showing a low-level pulse at the center of the frequency band at various points in the circuit of FIG. 2.

Referring to FIG. 5, there is shown the same set of waveforms but the condition being that there is a lower level pulse at the band center which pulse does not exceed the threshold (THD). These conditions show that while the I signal is produced the K signal will not be produced due to the fact that the J signal is not provided under this condition of operation.

Hence as seen from the above waveforms, as indicated in FIGS. 3, 4 and 5, these waveforms show that an incoming RF pulse must be above the threshold level and inside the frequency limits to produce an output pulse. If these conditions are not met then the circuit operation will not be implemented, and hence one can now discriminate against spurious RF pulses while avoiding all of the above noted problems inherent with double detection receiver devices of the prior art.

Figure 6:
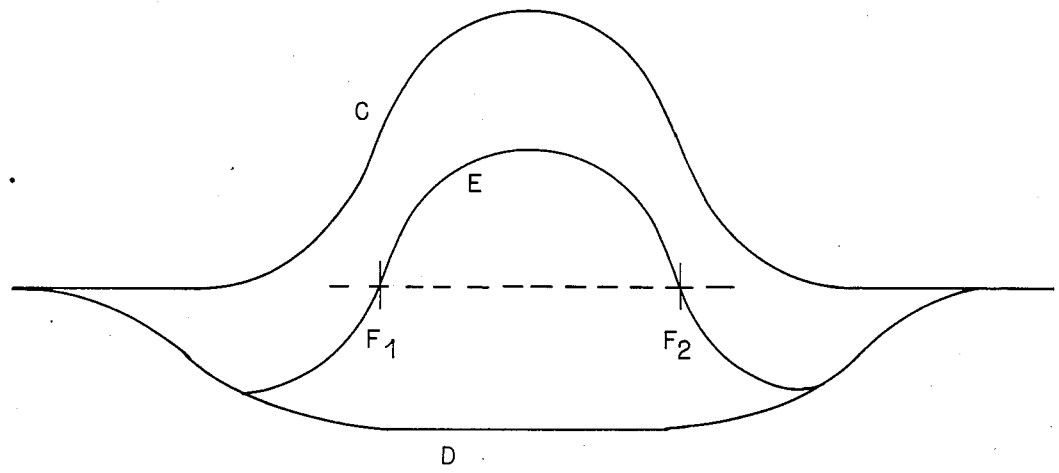
FIG. 6 is CW-swept response depicting the nature of the bandpass characteristics at various points in the circuit shown in FIG. 2.

Referring to FIG. 6, there is shown a typical continuous wave (CW) swept frequency response at points C, D and E of the circuit of FIG. 2. As can be seen from FIG. 6, since the frequency comparator 44 is employed utilizing ground as a threshold, the go/no go frequencies are F1 and F2 as shown. These crossing frequencies remain fixed at all input signal levels as long as the RF amplifiers are kept out of compression at the frequencies F1 and F2. It is noted that the curve D is relatively flat from F1 to F2. Since curve D which is the wideband response is used for signal level sensing, the threshold level vs. frequency is relatively constant from F1 to F2.

Figure 7:
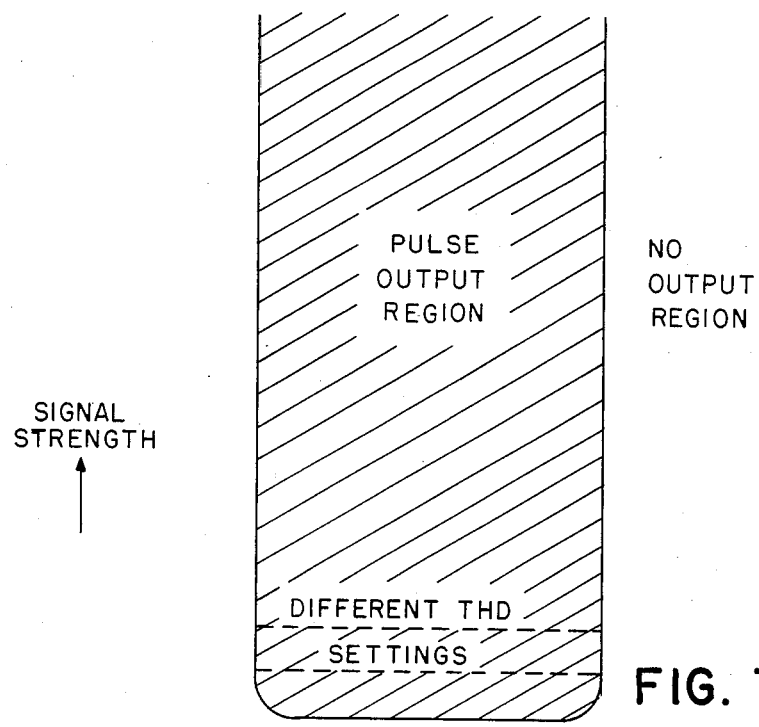
FIG. 7 is a go/no-go response for the double detection receiver system depicted in FIG. 2.

Referring to FIG. 7, there is shown the resulting signal level go/no go region vs. frequency for the system shown in FIG. 2. Since separate comparators are used to sense frequency and amplitude, as for example comparators 44 and 45, the corners of the go region are nearly at right angles as shown for frequency F2. Thus the entire receiver has the desired brickwall response while circumventing the problems of the prior art devices.

As one can see, the above noted circuitry uses separate dedicated video channels to overcome many of the problems attendant in the prior art. As one can see from FIG. 2, the wideband channel is dedicated to signal level detection. Since the filter 33 which is the bandpass filter in this channel has nearly flat amplitude response over the design bandwidth the threshold signal level is nearly constant over this bandwidth.

Second, the subtractor channel uses an added amplifier 41 and comparator 42 for frequency detection. This added comparator is referenced against ground rather than a threshold level. This provides a vertical brickwall response at the band edge. This band edge selectivity is much steeper than an eleven pole Chebychev filter and its bandwidth can be adjusted or set by a potentiometer as will be explained.

Third, since the narrow or wideband filter channel is used directly for pulse detection without subtracting, the group delay curve is nearly flat and is constant over the desired bandwidth.

Fourth, since neither the pulse detector channel nor the signal level channel uses the subtractor output, there is no negative going pulses which can appear on the detected video, and hence this problem is circumvented.

Thus the above described circuit has many advantages over prior art double detection receivers.

Figure 8:
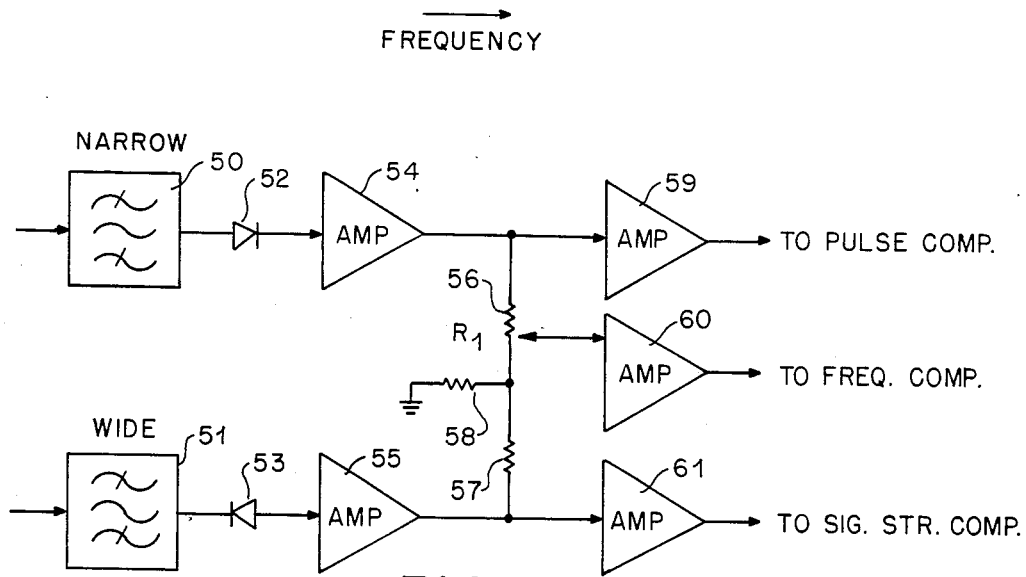
FIG. 8 is an alternate embodiment for a double detection receiver system according to this invention employing a potentiometer for bandwidth adjustment.
Figure 9:
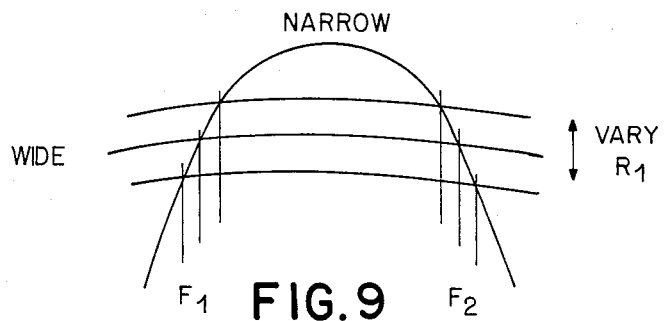
FIG. 9 is a diagram depicting the bandwidth adjustment capabilities of the circuit of FIG. 8.

Referring to FIG. 8, there is shown a modification of the circuit which permits bandwidth adjustment by varying a potentiometer as potentiometer 56. The circuit employed in FIG. 8 shows reverse detector polarities for the square-law detectors 52 and 53. As seen in FIG. 8, the narrow bandpass filter 50 is coupled to a positively poled detector 52 whereby the signal in the narrow band amplifier is detected and applied to amplifier 54. The wideband channel utilizes a reverse polarity detector 53 whose signal is applied to amplifier 55. Amplifiers 54 and 55 are coupled by means of a resistive divider consisting of a potentiometer 56, resistor 57 and resistor 58. This divider, of course, is essentially a summing circuit. The output from the narrow band channel is applied directly to amplifier 59 while the output from the wideband channel is applied directly to the input of amplifier 61. The output of amplifier 59 goes to the pulse comparator while the output of amplifier 61 is directed to the signal strength comparator. The output to the frequency comparator is taken via amplifier 60 whose input is coupled to the variable arm of potentiometer 56 forming part of the summing circuit or voltage divider. Hence the input to amplifier 60 is variable. By varying potentiometer 56, one can now vary the bandwidth of the circuit as shown for example in FIG. 9. It is, of course, understood that the polarity of diodes 52 and 53 can be reversed, and hence the diode in the narrow band circuit can be negatively poled with respect to the diode in the wideband circuit.

In any event, one can therefore obtain a simple bandwidth adjustment by utilizing the technique described in FIG. 8 together with the remaining circuitry as shown in FIG. 2 for the pulse comparator, frequency comparator and the signal strength comparator. Essentially, as indicated, the circuit shown below presents many advantages as compared to double detection circuits known in the prior art.

The circuit, as indicated, includes the advantage of prior art double detection receivers in that it allows simpler, easy to build filters which require little or no tuning. This, of course, substantially reduces the cost, the labor and the weight of a double detection receiver as compared to the single detection devices. Since the filters, as the narrow and wide bandpass filters, have few poles, they have flatter group delay curves than multipole Chebychev filters utilized in single detection systems.

These filters can be Bessel-tuned for flattest delay since tuning has little effect on return loss or ripple with low pole count filters. Essentially, because of the low pole count and the go/no go frequency comparator, a double detection receiver with this invention does not produce spikes on the detected video output pulse. As explained above, these spikes are produced by a single channel receiver utilizing multipole filter responses. It is, of course, understood that the circuit of FIG. 2 operates in a more efficient and superior manner than any of the double detection receivers of the prior art while circumventing most of the problems associated with single detection devices.

The circuit can be employed without the use of the pulse comparator as pulse comparator 43 and therefore will operate to detect signal presence only by utilizing the signal strength comparator 45 in conjunction with the frequency comparator 44. The circuit can be used in conjunction with the pulse comparator if it is desired to develop accurate pulse width and/or time of arrival detection. The pulse comparator 43 can be driven by the narrow channel as shown for an optimum signal to noise ratio based on the switch 39 or can be optionally driven by the wide channel for more constant amplitude over the band. This is a pure function of the signaling desired and the nature of the transmission channel.

Several double detection channels can be configured with contiguous bandwidths to give broad coverage with each circuit having a separate output for each segment of the frequency band. In such an application this invention provides a more constant threshold level over the entire coverage range which means less overlap of strong signals because of the brickwall response, as for example shown in FIG. 7. It is, of course, understood that based on the circuitry shown in FIG. 8 and the operation depicted in FIG. 9, one can obtain bandwidth adjustment by a simple potentiometer adjustment. This technique was not available utilizing prior art configurations.

Hence it is understood that the above-noted circuit circumvents most of the problems attendant in both single and double detection receiver devices of the prior art and hence is an improved circuit structure exhibiting superior performance and operation over those devices depicted in the prior art.

What is claimed is:

1. In a double detection receiver apparatus of the type capable of detecting and demodulating a pulsed radio frequency signal and having a first wideband channel and a second narrow band channel with corresponding detectors in each channel for providing a pulse output and an subtractor circuit for responding to said pulse outputs for providing a difference pulse, in combination therewith apparatus for improving the performance of said receiver comprising:

frequency comparator means responsive to said difference pulse and operative to provide an output signal when said pulse is within an acceptable frequency range, signal strength comparator means responsive to said pulse output in said wideband channel to provide an output signal indicative of an acceptable RF input signal level, means responsive to said frequency comparator output signal and said signal strength comparator output signal to provide a pulse presence output signal only during the presence of both said frequency comparator and said signal strength comparator output signals.

2. The double detection receiver apparatus according to claim 1, further comprising a pulse comparator means having an input selectively coupled to either said wideband or narrow band channels and including first means coupled to said frequency comparator means for enabling the same during said output signal of said frequency comparator and second means coupled to said signal strength comparator for enabling the same during said output of said signal comparator whereby said pulse comparator means is enabled only during the presence of both outputs from said frequency and signal strength comparator.

3. The double detection receiver according to claim 2, including switching means for selecting said pulse comparator to receive either said wideband or narrow band pulse output.

4. The double detection receiver according to claim 1, wherein said means responsive to said frequency comparator output signal and said phase comparator output signal comprises an AND gate having one input coupled to the output of said frequency comparator and another input coupled to the output of said signal strength comparator.

5. The double detection receiver according to claim 1, wherein said frequency comparator means includes a frequency comparator having a threshold referenced at ground potential.

6. The double detection receiver according to claim 1, further including impedance means coupled between said wide and narrow band channels including a variable impedance device for applying an adjustable pulse signal to said frequency comparator means for adjusting the bandwidth of said receiver.

7. A double detection receiver apparatus for detecting and demodulating a pulsed radio frequency (RF) carrier signal indicative of ON/OFF keying (OOK), comprising:

a narrow channel means including a first narrow bandpass filter responsive to said RF carrier signal for providing a first output RF signal of a given bandwidth, first video detection means responsive to said first output RF signal for providing a first detected version thereof, a wideband channel means including a second wideband bandpass filter for providing a second output RF signal, second video detection means responsive to said second output RF signal for providing a second detected version thereof, arithmetic means responsive to said first and second detected versions of said RF signals to provide at an output terminal a difference signal, frequency comparator means responsive to said difference signal to provide an output when said signal is within a given frequency range, signal strength comparator means responsive to said detected signal from said wideband channel means to provide an output when said signal exceeds a predetermined threshold, and gating means responsive to said outputs from said frequency comparator means and said signal strength means to provide an output signal only during the presence of both outputs to indicate the presence of a received pulse within given frequency limits as determined by said frequency comparator means and a given magnitude as determined by said signal strength comparator means.

8. The double detection receiver according to claim 7, wherein said arithmetic means comprises a subtractor employed for the same video detection polarity in said narrow and wideband channels.

9. The double detection receiver according to claim 7, wherein said arithmetic means comprises an adder for opposite video detection polarity in said narrow and wideband channels.

10. The double detection receiver according to claim 9, wherein said wideband filter has a relative flat amplitude response over the 3 db bandwidth of said narrow band filter.

11. The double detection receiver according to claim 7, further comprising:

output pulse comparator means having an input selectively coupled to said first and second video detection means for selecting either one of said means for application to said input and responsive to said output from said signal strength comparator for enabling said pulse comparator means during said output, and gating means coupled to said pulse comparator means and responsive to the output of said frequency comparator means to provide a pulse when an input from said pulse comparator is present and when an output pulse from said frequency comparator is present.

12. The double detection receiver according to claim 7, wherein said gating means includes an AND gate having one input responsive to said output from said frequency comparator means and one input responsive to said output of said signal strength comparator means, to provide at an output of said AND gate a signal indicative of the presence of a proper received pulse.

13. The double detection receiver according to claim 7, wherein said arithmetic means includes a voltage divider coupled between said first and second detection means and including an adjustable divider element for selectively coupling a portion of said signal from said divider to said frequency comparator means for selectively adjusting the bandwidth of said receiver.

14. The double detection receiver according to claim 7, wherein said first and second bandpass filter have at least 2 poles.

15. The double detection receiver according to claim 7, wherein said first and second bandpass filters have at least 3 poles.

16. The double detection receiver according to claim 7, further including a first video amplifier having an input coupled to said output of said arithmetic means and having an output coupled to said frequency comparator means.

17. The double detection receiver according to claim 7, wherein said first and second video detection means each includes square-law detection means.

18. The double detection receiver according to claim 7, wherein said frequency comparator means has a comparison threshold referenced to a point of reference potential.

19. The double detection receiver according to claim 7, further including means coupled to said frequency comparator means for adjusting the bandwidth of said receiver response.

20. The double detection receiver according to claim 7, wherein said first and second detection means provide detected signals of opposite polarity.

* * * * *